United States Patent
Kim (10) Patent No.: US 7,602,753 B2
(45) Date of Patent: Oct. 13, 2009

(54) APPARATUS AND METHOD FOR TRACING GPRS TUNNEL PROTOCOL RESOURCE

(75) Inventor: Tae Yong Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 914 days.

(21) Appl. No.: 10/796,159

(22) Filed: Mar. 10, 2004

(65) Prior Publication Data

US 2004/0179504 A1 Sep. 16, 2004

(30) Foreign Application Priority Data

Mar. 12, 2003 (KR) .................. 10-2003-0015526
Jan. 15, 2004 (KR) .................. 10-2004-0002962

(51) Int. Cl.
*H04W 4/00* (2009.01)
*H04L 12/26* (2006.01)

(52) U.S. Cl. .................... 370/338; 370/252

(58) Field of Classification Search ............... 370/338, 370/252, 352; 455/435.1, 433
See application file for complete search history.

(56) References Cited

U.S. PATENT DOCUMENTS 6,937,572 B1 * 8/2005 Egan et al. ............ 370/252

2004/0023654 A1 * 2/2004 Jang .................. 455/435.1

FOREIGN PATENT DOCUMENTS

| KR | 1020000033962 A | 6/2000 |
| KR | 1020020051559 | 6/2002 |
| KR | 1020020051559 A | 6/2002 |
| KR | 1020020091953 | 12/2002 |
| KR | 1020030005548 | 1/2003 |
| KR | 1020030020621 | 3/2003 |

* cited by examiner

*Primary Examiner*—Melody Mehrpour
(74) *Attorney, Agent, or Firm*—Ked & Associates, LLP (57) ABSTRACT

An apparatus and method for tracing a reserved resource of a GTP-U user message trafficked between SGSN (Serving GPRS Support Node) and GGSN (GPRS Gateway Serving Node) sets a tracing function for the reserved resource of a GTP-U using a TEID for a subscriber to be traced, and outputs information for the reserved resource by detecting the GTP-U having the tracing function set therein. The present invention effectively manages packet troubles generated from the SGSN and an attack of DDOS through the GTP-U on Internet by isolating the interface generating the corresponding attack. As a result, the system is prevented from lowering managing performance by automatically stopping GTP-U tracing through a tracing function duration and a trace critical value.

18 Claims, 10 Drawing Sheets

| Attribute | meaning |
|---|---|
| INDEX | Tracing Information Index |
| IMSI | Number of subscriber to be traced |
| IMSI_CNT | Diait Number of subscriber |
| IP_ADDR | IP Address of subscriber to be traced |
| TRC_TYPE | Current Tracing Type |
| TEID | Tunnel Identifier |
| DURATION | Tracing function Duration |
| Up/Down stream LMT | Trace Critical Value |
| Up/Down stream CNT | Trace Count Value |
| TIMER_ID | Timer Identifier |

APPARATUS AND METHOD FOR TRACING GPRS TUNNEL PROTOCOL RESOURCE

This application claims the benefit of Korean Application Nos. P2003-0015526, filed on Mar. 12, 2003 and P2004-0002962 filed on Jan. 15, 2004 which are hereby incorporated by reference as if fully set forth herein.

BACKGROUND OF THE INVENTION

1. Field of the Invention

The present invention generally relates to communication systems, and more particularly to an apparatus and method for tracing a GPRS tunnel protocol resource so as to manage an attack of DDOS (Distributed Denial of Service) from outside to GGSN or an error of a packet transmission of a particular subscriber by tracing allotted resources of a GTP user message trafficked between SGSN (Serving GPRS Support Node) and GGSN.

2. Discussion of the Related Art

In general, a mobile communication system is divided into a packet exchanger providing a service such as an Internet connection and a circuit exchanger providing a conventional telephone network connection. These connections are described in greater detail below.

Figure 1:
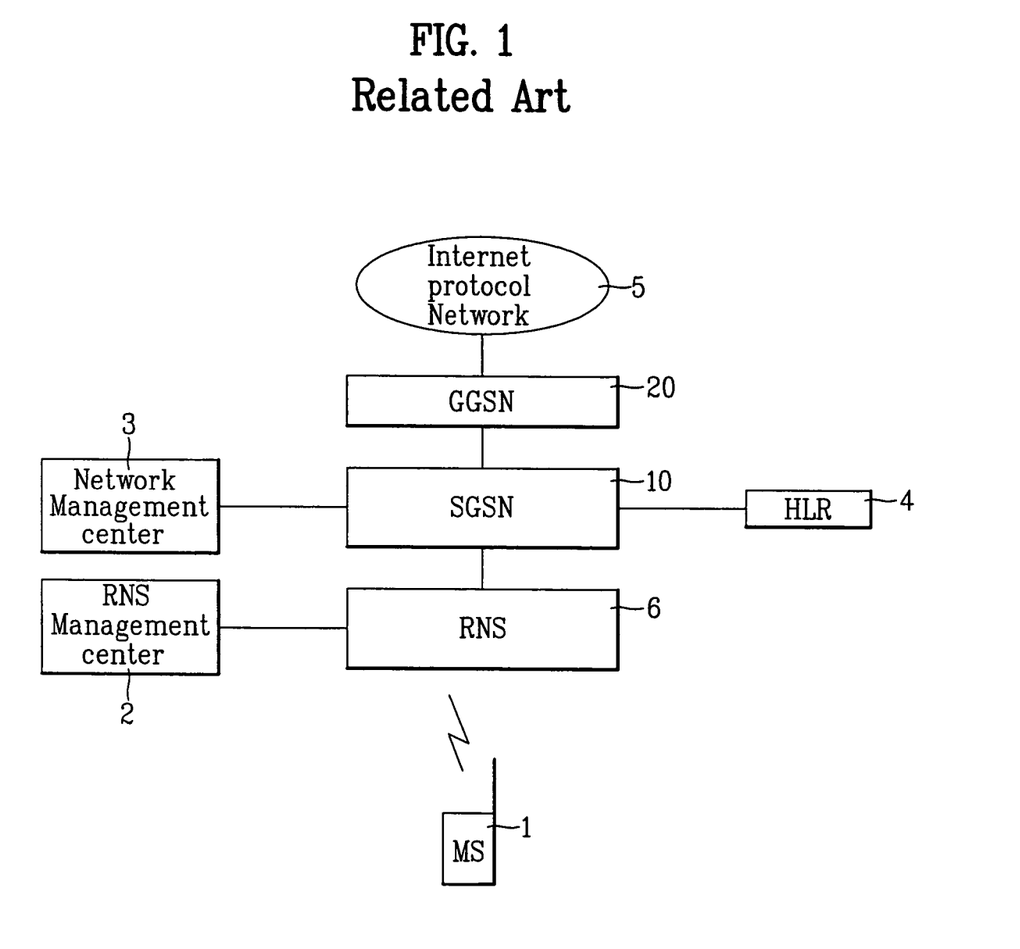
FIG. 1 is a block diagram showing a related-art packet-type mobile communication system.

FIG. 1 shows a related-art packet-type mobile communication system. The packet-type mobile communication system, as illustrated in FIG. 1, includes an internet protocol network 5, a GGSN: Gateway GPRS (General packet radio service) Support Node 20, a SGSN: Serving GPRS Support Node 10, a RNS: Radio Network Subsystem 6, a HLR: Home Location Register 4, a network management center 3, and a radio network subsystem management center 2.

The GGSN performs a gateway function for establishing a connection to the Internet protocol network. The SGSN is connected to the GGSN through the GPRS network to manage mobility of a mobile system 1 in packet mode and to perform the function of the packet exchanger. The HLR is connected to the SGSN for managing subscription information and location information of a packet service subscriber. The RNS manages wireless resources, allocates traffic channels, and transmits/receives data to/from the mobile system. The network management center and the radio network subsystem management center perform functions such as tracing and watching the packet calls.

Figure 2:
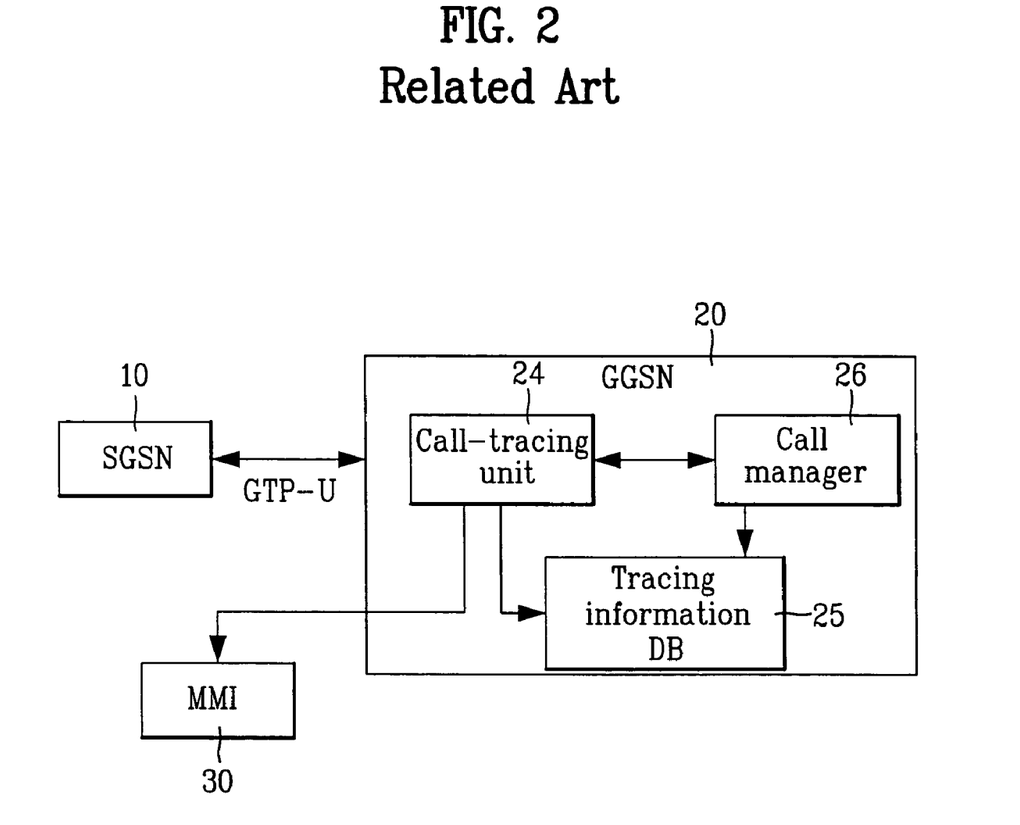
FIG. 2 is a block diagram showing a related art GTP resource tracing system.

FIG. 2 shows a related-art GTP resource tracing system for tracing a call and transmitting the call to an operator whenever a GTP control message (GPRS tunnel protocol control message, hereinafter abbreviated 'GTP-C') is received from the SGSN 10 or the Internet protocol network 5. This system includes the GGSN 20 directly connected to an external packet data network (internet) for performing tunneling and routing functions. The SGSN is connected to the GGSN through the GPRS for managing the mobility of the packet-type mobile system and for performing the function of the packet exchanger. An MMI (Man Machine Interface) 30 serves as an interface for a call-tracing request signal and call-tracing information of a corresponding call for a particular subscriber between the operator and the GGSN.

More specifically, as illustrated in FIG. 2, the GGSN includes a call tracing unit 24, a call manager 26, and a tracing information DB 25. The tracing information DB stores information of a call tracing in progress. The call-tracing unit traces a corresponding GTP-C and reports the resource information (hereinafter abbreviated GTP resource information) reserved by a corresponding message to the operator when a call tracing request signal for a particular subscriber is received from the operator through the MMI. In other words, upon receiving the call tracing request signal from the operator, the call-tracing unit sets a GTP-C tracing function by storing an identification information (hereinafter 'tracing information') of a tracing object subscriber included in the corresponding message into the tracing information DB, and reports the GTP resource information to the operator through the MMI when the GTP resource information is received from the call manager.

The call manager 26 generates a tunnel between the SGSN and the GGSN, confirms whether the GTP-C tracing function for the corresponding subscriber is set by searching the tracing information DB when the GTP-C is received through the generated tunnel, and transmits the corresponding GTP resource information to the call-tracing unit if the GTP-C tracing function is set. In this case, the tracing information is stored in the tracing information DB by the call tracing unit, and the tracing information stored in the tracing information DB is searched by the call manager.

However, there are problems in the related-art GTP resource tracing method For example, CS (Circuit Service) base, since a call is managed only for a voice message subscriber, only a signal message corresponding to the GTP-C is traced. Therefore, all information cannot be traced because a resource allotted at a step of signaling is not changed in a process of transmitting voice data.

However, in a PS (Packet Service) base, the resource determined at the step of signaling may not be fixed as the related-art CS base, but may be changed in the process of transmitting data. Therefore, when call tracing is carried out only for the GTP-C, tracing for the GTP-U that is current user data generated from the SGSN or a GTP-U message received through the internet is not carried out from the reserved resource in the exchanger.

When trouble occurs in a packet transmitted from the SGSN, it is difficult for an operator of the exchanger to troubleshoot the underlying problem because it is difficult to exactly determine which interface unit is having the trouble.

Furthermore, in a case of the GTP-C trafficked from the Internet, when the corresponding message is under an attack of DDOS, the interface being attacked is not identified. Therefore, fast troubleshooting is not possible and there is a serious problem of damaging security and reliability of the exchanger.

SUMMARY OF THE INVENTION

An object of the present invention is to provide an apparatus and method for tracing a GPRS tunnel protocol resource that substantially obviates one or more problems due to limitations and disadvantages of the related art.

Another object of the present invention is to provide an apparatus and method for tracing a GPRS tunnel protocol resource for enabling acknowledgment of the GTP resource allotted to a GTP-U, by tracing the GTP-U of a real subscriber using TEID of the subscriber to be traced.

To achieve these and other objects and advantages, the present invention provides in accordance with one embodiment, an apparatus for tracing a GPRS tunnel protocol resource comprising a call tracing unit for receiving a command of call tracing from an operator through MMI and performing call tracing; a call tracing DB for storing call tracing data currently processed; a GTP-U tracing unit for reporting a GTP-U message to the call tracing unit; a SGSN interface unit for receiving the GTP-U message outputted from the SGSN; and an internet interface unit for transmitting the GTP-U message routed at the GTP-U tracing unit.

The apparatus for tracing GTP resource further includes a call manager for working together with the SGSN and setting a call for a subscriber, searching whether GTP-C tracing function for a corresponding subscriber is set in the tracing information DB when the GTP-C is received, transmitting the corresponding GTP-C tracing information to the call tracing unit, and sending whether the call for a subscriber to be traced is canceled during the trace of the GTP-U and transmitting a session termination of the corresponding subscriber to the GTP-U tracing unit.

The GTP-U tracing unit includes a call tracing interface unit for processing and transmitting a result of GTP-U data tracing and a message requested from the call tracing unit; a TEID converter for converting the IMSI or IP received from the call tracing interface unit; a trace load controller for minimizing the subordination of the exchanger, the subordination generated from the GTP-U data tracing; a GTP-U traffic detector for detecting a traffic for tracing the GTP-U requested by the operator between the SGSN interface unit and the internet interface unit; and a GTP-U tracing DB for storing information for mapping the IMSI and the TEID and information of other corresponding tracing.

In accordance with another embodiment, the present invention provides a method for tracing GTP resource trafficked between the SGSN and SDSN at the packet exchanger having SGSN, the call tracing unit, the call manager, and the GGSN having the tracing information DB and GTP-U tracing unit includes the steps of setting the tracing function for reserved resources of the subscriber message by using the TEID of the subscriber to be traced; and outputting information for the corresponding resource by detecting the subscriber message with a set of the tracing function.

In this case, the step of setting the tracing function includes a first step wherein the call tracing unit requests GTP user message tracing function registration by transmitting the user tracing information received from the operator to the GTP-U tracing unit; a second step wherein the GTP-U tracing unit performs mapping the TEID allotted to the user using the tracing information; a third step wherein the GTP-U tracing unit registers the GTP user message tracing function using the GTP-U tracing unit and transmitting to the call tracing unit; and a fourth step wherein the call tracing unit stores the TEID together with the tracing information in the tracing information DB.

The step of setting the tracing function, further comprising a step wherein the GTP-U tracing unit transmits a reply message to a request of registering the GTP user message tracing function to the call tracing unit after the first step.

The step of setting the tracing function, further comprising a step wherein the call tracing unit notifies a failure of setting the GTP user message tracing function to the operator when there is no reply message to the request of registering the GTP user message tracing function from the GTP-U tracing unit within a predetermined time.

At the second step, if there is no existing call for the subscriber when the TEID allotted to the subscriber is mapped, the GTP-U tracing unit transmits the reply message to the request of registering the GTP user message tracing function to the call tracing unit, and the call tracing unit notifies a failure of setting the GTP user message tracing function to the operator The tracing information includes the IMSI and IP address of the subscriber, a tracing type for commanding the subscriber message tracing, and a trace critical value, i.e., a maximum number of the message of the subscriber to be traced.

The tracing type includes 2bits indicating a SGSN record type, and the tracing type dividing call watching, call tracing, and the user message for tracing according to the SGSN record type of the 2bits.

The tracing information, TEID and the trace count value that is the number of traced message are stored in the tracing information DB.

In registering the TEID, the GTP-U tracing unit includes a step of converting the tracing information (IMSI or IP) received from the call tracing unit and storing the converted TEID and the tracing information, and activating the tracing flag of the corresponding TEID field.

The step of outputting the reserved resource information includes the steps of conforming the TEID of the trafficked subscriber message; confirming whether the tracing flag of the confirmed TEID is activated by searching the TEID table; transmitting the reserved resource information of the subscriber together with the TEID to the call tracing unit when the tracing flag is activated; and outputting the reserved resource information to the operator by using the TEID from the call tracing unit.

The reserved resource information includes an AMA number of trafficked subscriber message, an interface number, a VPI/VCI, a link band, a value directing a stream direction of the data, and the trace count value.

The step of outputting the reserved resource information includes the steps of confirming whether the TEID is stored by searching the tracing information DB; mapping the subscriber tracing information corresponding to the TEID and outputting the resource information to the operator when the resource information is stored in the TEID; increasing the trace count value in the call tracing information and comparing the stored trace critical value; and deleting the TEID and the corresponding tracing information in the tracing information DB when the trace count value is the same as the trace critical value.

The comparison of the trace count value and the trace critical value is separately carried out for each of up stream and down stream, and the TEID and the corresponding tracing information are deleted from the tracing information DB when the trace count value of one of the up/down streams is the same as the trace critical value.

If there is time information for maintaining corresponding tracing function in the tracing information, a step of operating a timer corresponding to the duration is further included when the TEID is received from the call tracing unit.

The call tracing unit cancels the tracing function of the corresponding subscriber message by deleting the TEID of the corresponding tracing information from the tracing information DB when the timer is terminated. If the call for the subscriber is canceled, a step of canceling the set of the tracing function is further included.

The step of canceling the tracing function includes the steps of transmitting the a session termination notice having an identification information of the subscriber whose call is canceled at the call tracing unit to the call tracing unit; and canceling the subscriber message tracing function by deleting the corresponding TEID and the tracing information in the tracing information DB using the identification information at the tracing information DB.

This application claims the benefit of Korean Application Nos. P2003-0015526, filed on Mar. 12, 2003 and P2004-0002962, filed on Jan. 15, 2004 which are hereby incorporated by reference as if fully set forth herein.

It is to be understood that both the foregoing general description and the following detailed description of the present invention are exemplary and explanatory and are intended to provide further explanation of the invention as claimed.

DETAILED DESCRIPTION OF THE INVENTION

Figure 3A:
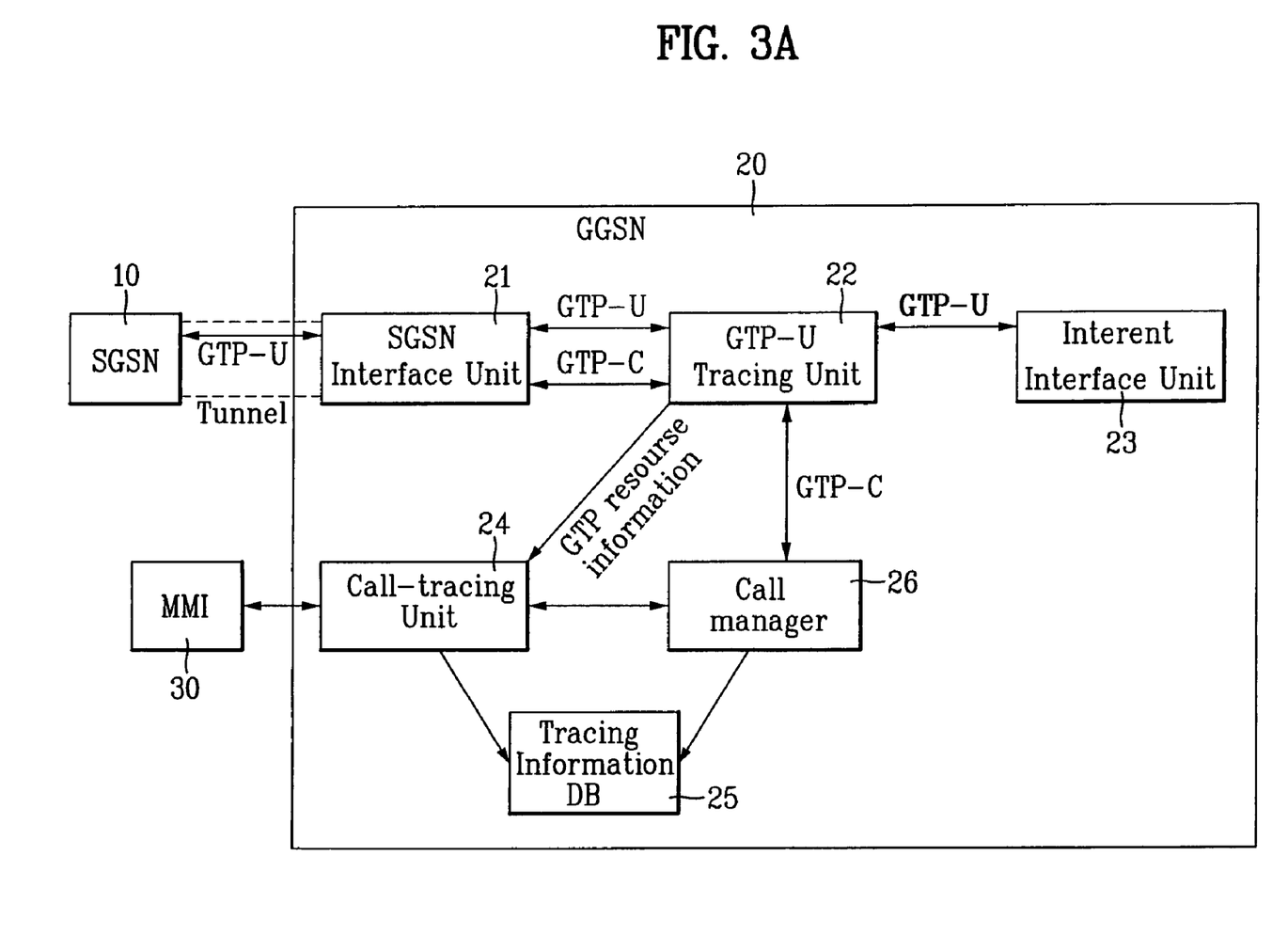
FIG. 3A illustrates a block diagram showing GTP resource tracing system in accordance with one embodiment of the present invention.
Figure 3B:
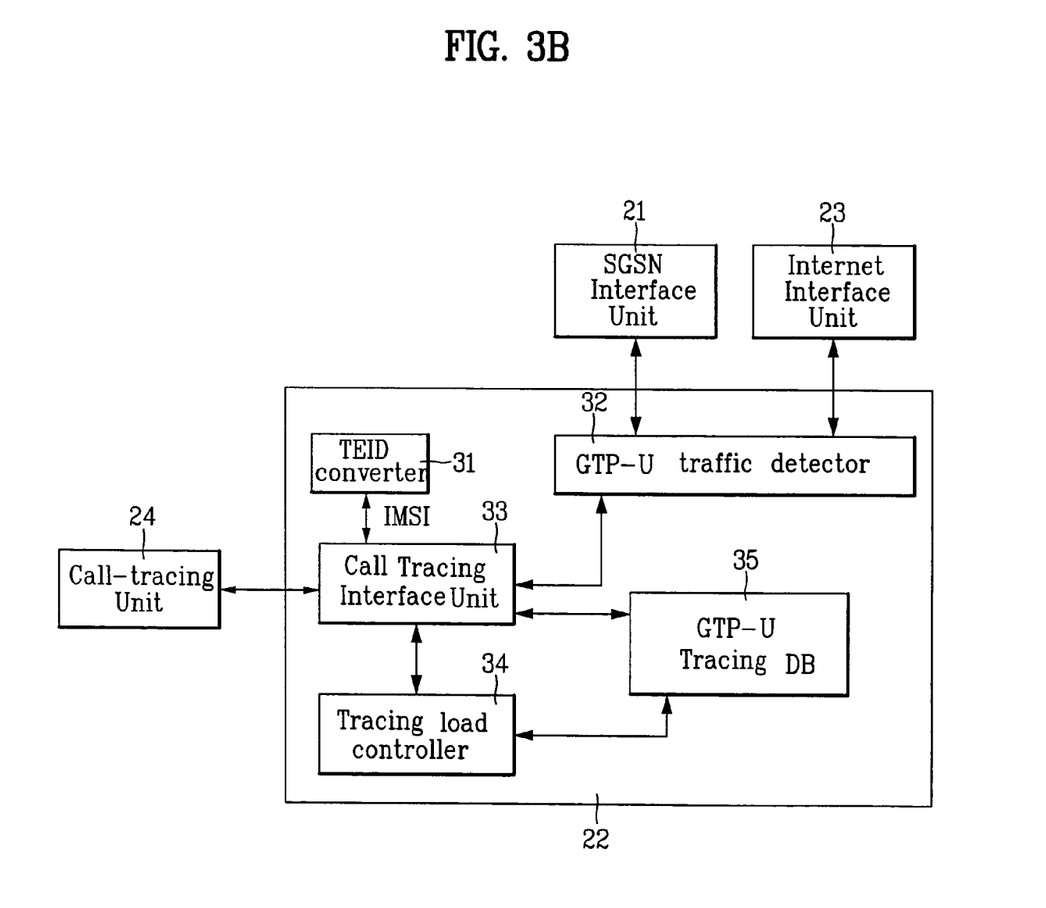
FIG. 3B illustrates a block diagram showing in detail UTP-U tracing unit of FIG. 3A.

FIG. 3a shows a GTP resource tracing system in accordance with one embodiment of the present invention, and FIG. 3B shows a UTP-U tracing unit of FIG. 3A. As illustrated in FIG. 3A, the GTP-C tracing system includes a SGSN interface unit 21, a GTP-U tracing unit 22, an internet interface unit 23, a call tracing unit 24, a call manager 26, and a tracing information DB 25.

The SGSN interface unit 21 receives a GPRS tunnel protocol user message (hereinafter "GTP-U") output from the SGSN 10. The GTP-U tracing unit 22 traces the GTP-U message by routing the GTP-U message received through the SGSN interface unit, reports the traced GTP message to the call tracing unit 24. The Internet interface unit 23 transmits the GTP-U message routed from the GTP-U tracing unit to the Internet network 5.

The call-tracing unit 24 not only receives a call-tracing request signal for a particular subscriber from the operator through the MMI 30, but also receives tracing request signals of the GTP-C and GTP-U for tracing allocation resources of GTP-C and GTP-U of the particular subscriber.

When receiving the GTP-C, the call manager 26 works together with the SGSN 10 and generates a tunnel between the SGSN 10 and the GGSN 20, and sets a call for a subscriber. In this instance, the call manager 26 confirms whether the GTP-C tracing function is set by searching the tracing information DB 25, and transmits corresponding GTP resource information to the call tracing unit 24 if the tracing function is set. Upon receiving GTP-U, the call manager 26 senses whether a call for a subscriber for tracing is canceled, transmits a call session termination of the corresponding subscriber to the GTP-U tracing unit as if the call of the subscriber us canceled, and directs a tracing termination.

In this case, as illustrated in FIG. 3B, the GTP-U tracing unit 22 includes a TEID (Tunnel Endpoint Identifier) converter 31, a GTP-U traffic detector 32, a call tracing interface unit 33, a trace load controller 34, and a GTP-U tracing DB 35.

The TEID converter 31 performs a function of converting an IMSI (International Mobile Subscriber Identifier) or an IP (Internet Protocol) into a TEID.

The call tracing interface unit 33 performs a function of managing and transmitting a GTP-U data tracing result or a message requested from the call tracing unit 24.

The trace load controller 33 performs a function of minimizing the subordination of the exchanger generated from tracing the GTP-U data. The GTP-U traffic detector 32 performs a function of detecting traffic between the SGSN interface unit 21 and the internet interface unit 23 for tracing GTP-U requested by the operator.

The GTP-U tracing DB 35 stores information for mapping the IMSI and TEID, and other information for corresponding tracing.

A tracing method performed by the GTP tracing apparatus in accordance with one embodiment of the present invention will now be explained. First, art for the call tracing (GTP-C) is briefly described as follows. Upon receiving the GTP-C tracing request message, the call-tracing unit 24 analyzes the received GTP-C tracing request message, stores the analyzed information in the tracing information DB 25, and transmits a GTP-C tracing function success message to the operator through the MMI 30.

The call manager 26 confirms whether the GTP-C tracing function is set by searching the tracing information DB 25. When the corresponding function is set, the call manager 26 transmits the received GTP-C to the call tracing unit 24 if a tracing type is call tracing, or communication ending time and location information of the subscriber to the call-tracing unit 24 after removing the corresponding call if the tracing type is call watching.

In addition, upon receiving the GTP-C, the call tracing unit 24, reports the status of a currently processed call to the operator, and upon removing the corresponding call reports information of received communication ending time and the location of the subscriber to the operator.

The GTP-U tracing will now be described. The GTP-U tracing request signal includes the tracing information. The tracing information includes information such as the IMSI or an IP address, a tracing type, a trace critical value, and further includes information of tracing function duration time. IMSI is a subscriber identification number and IP is an address allotted to the corresponding subscriber to call through the internet. The tracing type refers to a method of performing a corresponding tracing. In a case of tracing the GTP-U, the SGSN 10 record-type bits are preferably set as in Table 1.

TABLE 1

| Tracing type | Bit 4 | Bit 3 | Bit 2 | Bit 1 |
|---|---|---|---|---|
| GTP-U tracing | 0 | 1 | 1 | 1 |

In other words, the tracing type refers to a case of call watching when the SGSN record type bits 3 and 4 are set in 0 and 1, a case of call tracing when those are set in 0 and 0, and a case of GTP-U tracing when those are set in 1 and 0.

The critical value for tracing is a parameter for limiting the number of messages to be traced during GTP-U tracing, and is divided into an up-stream critical value and a down-stream critical value according to a traffic direction of the message.

The up-stream critical value is a maximum number of the tracing object messages trafficked from the SGSN 10 to the internet, and the down-stream critical value is a maximum number of the tracing object messages trafficked from the internet to the SGSN 10. The trace critical value ends tracing GTP-U in a corresponding direction when the number (counted value) of traced messages reaches the trace critical value.

The trace function duration time is a parameter to prevent the GTP-U from being excessively traced for the performance of the system, and move specifically corresponds to the duration of GTP-U tracing. If the trace function duration time is exceeded, the GTP-U tracing is ended even when the number of the messages is under the trace critical value.

The call-tracing unit 24 of the present invention transmits the IMSI or the IP address or the trace critical value in the received tracing information to the GTP-U tracing unit 22, so as to request the GTP-U tracing function registration. The call-tracing unit also reports a response of the GTP-U tracing function registration to the MMI 30 when the tracing function is registered, and reports the GTP resource information to the operator through the MMI 30 by mapping the GTP resource information, the IMSI or IP address of the tracing object subscriber when the GTP resource information, i.e., the result of the GTP-U tracing is received from the GTP-U tracing unit 22.

TEID is identifies a plurality of virtual tunnels allotted to each call between GTP layers of the SGSN 10 and the SGSN interface unit 21.

Figure 4:
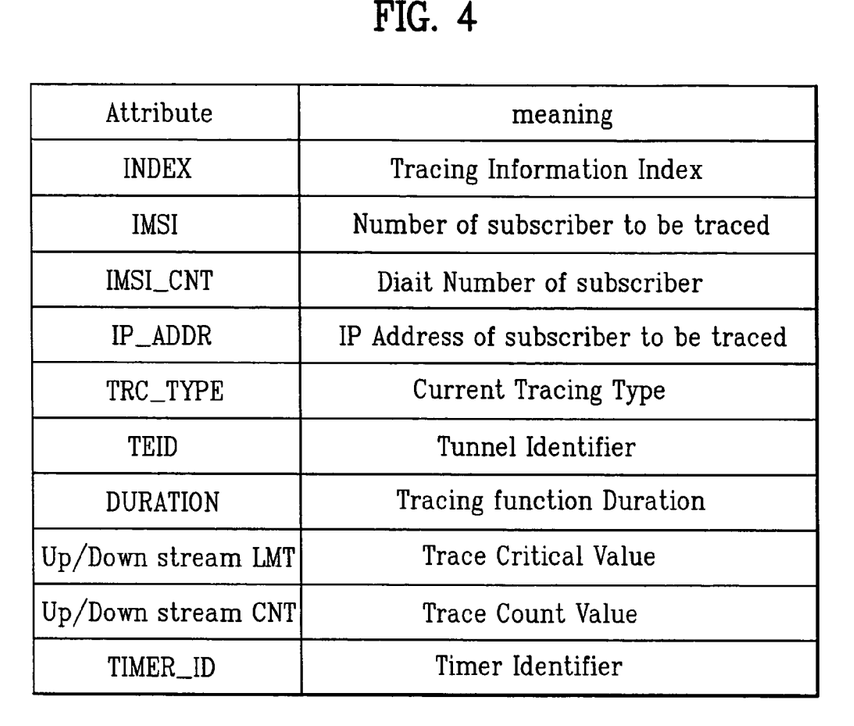
FIG. 4 illustrates a diagram showing a structure of the tracing information DB in accordance with one embodiment of the present invention.

FIG. 4 shows a preferred structure of the tracing information DB 35 in accordance with the present invention. The GTP-U tracing DB stores a tracing information index, an IMSI of the subscriber to be traced, a digit number of the IMSI (IMSI_CNT), the IP address (IP_ADDR), the tracing type (TRC_TYPE), the TEID mapped to the IMSI or IP address received from the call manager 26, a trace count value (Up/Down Stream CNT), and the trace critical value (Up/Down Stream LMT) as well as a timer identifier (TIMER_ID) operated during a corresponding duration when the trace function duration is received from the operator and the received trace function duration.

The GTP-U tracing DB 35 in accordance with the present invention preferably includes a separate DB different from the tracing information DB 25 for tracing a conventional GTP-C.

The GTP-U tracing unit 22 performs routing to the GTP-U received from the SGSN interface unit 21 using the TEID in Table 2 so as to transmit the received GTP-U to the internet (not shown in the drawing) through the interface unit 23, or performs routing to the GTP-U received through the internet interface unit 23 so as to transmit the received GTP-U to the SGSN 10 through the SGSN interface unit 21.

TABLE 2

| TEID | IP address | QoS | Stream band (Up/Down) | Tracing flag | Trace critical value | Trace count value |
| --- | --- | --- | --- | --- | --- | --- |

When the GTP-U with the TEID is detected, the GTP-U tracing unit 22 also transmits the GTP resource information as much as the trace critical value to the call-tracing unit 24 while increasing the trace count value.

In this instance, when the trace count value is the same as the trace critical value, the GTP-U tracing unit 22 inactivates the tracing flag and removes the corresponding GTP-U tracing function by deleting the trace count value and the trace critical value. The GTP resource information preferably includes information as shown in Table 3.

TABLE 3

| Field | CONTENTS |
| --- | --- |
| CNT | COUNT REPORTED TO CALL TRACING UNIT FOR UP/DOWN STREAM |
| STREAM DIR | STREAM DIRECTION |
| AMA NO | SGSN INTERFACE UNIT/AMA (ATM Management Assemble) NUMBER OF SGSN INTERFACE UNIT |
| INF NO | SGSN INTERFACE UNIT/INTERFACE NUMBER OF INTERNET INTERFACE UNIT |
| PROT NO | SGSN INTERFACE UNIT/PORT NUMBER OF INTERNET INTERFACE UNIT |
| VPI/VCI | SGSN INTERFACE UNIT/VPI/VCI NUMBER OF INTERNET INTERFACE UNIT |
| LINK BW | SGSN INTERFACE UNIT/UP/DOWN STREAM LINK BAND OF INTERNET INTERFACE UNIT |

Figure 5:
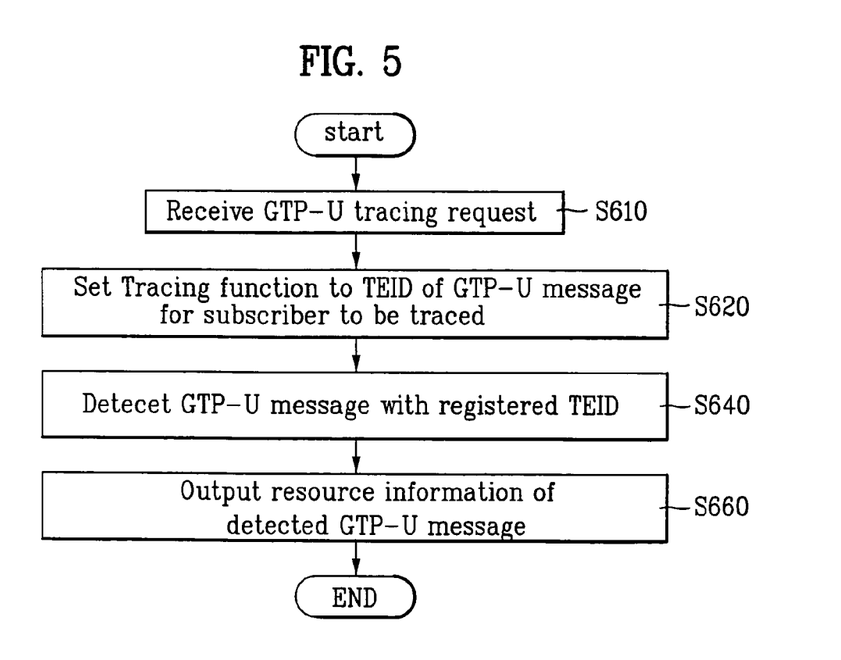
FIG. 5 illustrates a flow chart for tracing GTP-U in accordance with the present invention.

FIG. 5 is a flow chart for describing a tracing movement of GTP-U. Referring to FIG. 5, the call-tracing unit 24 receives GTP-U tracing request signal including in the tracing information of the subscriber to be traced from the operator through the MMI 30(S510). Unit 24 then stores the tracing information received from the operator and the TEID contained in the response message of the GTPU tracing function registration received from GTP-U tracing unit 22 to the tracing information DB 25, so as to set the GTP-U tracing function according to the GTP-U tracing request signal. (S520).

In other words, the call-tracing unit 24 stores the IMSI or IP address and the trace critical value in the tracing information, transmits them to the call tracing interface unit 33 of the GTP-U tracing unit 22 so as to request the GTP-U tracing function registration to the GTP-U tracing unit or converts the IMSI or IP address received from the call-tracing unit 24 to the TEID, stores GTP-U tracing function registration data corresponding to the TEID, and transmits the response message of GTP-U tracing function registration to the call tracing unit 24. The call-tracing unit 24 sets the GTP-U tracing function according to the GTP-U tracing request of the operator by storing the tracing information received from the operator, and the TEID contained in the response message of the GTP-U tracing function registration received from the GTP-U tracing unit 22 to the tracing information DB 25.

Meanwhile, the GTP-U tracing unit 22 traces the GTP-U trafficked through the SGSN interface unit 21 and the internet interface unit 23, and transmits the GTP resource information reserved by the corresponding GTP-U message to the call tracing unit 24 when the GTP-U to be traced is detected (S530). The call-tracing unit 24 then reports the received GTP resource information to the operator thorough the MMI 30 (S540).

Movement of the GTP-U tracing is now described in terms of setting the GTP-U tracing function and outputting the tracing and GTP resource information.

First, the setting method of the GTP-U tracing function is divided into a setting process by using the IMSI or IP address (call tracing unit) and another setting process by using the TEID (GTP-U tracing unit).

Figure 6:
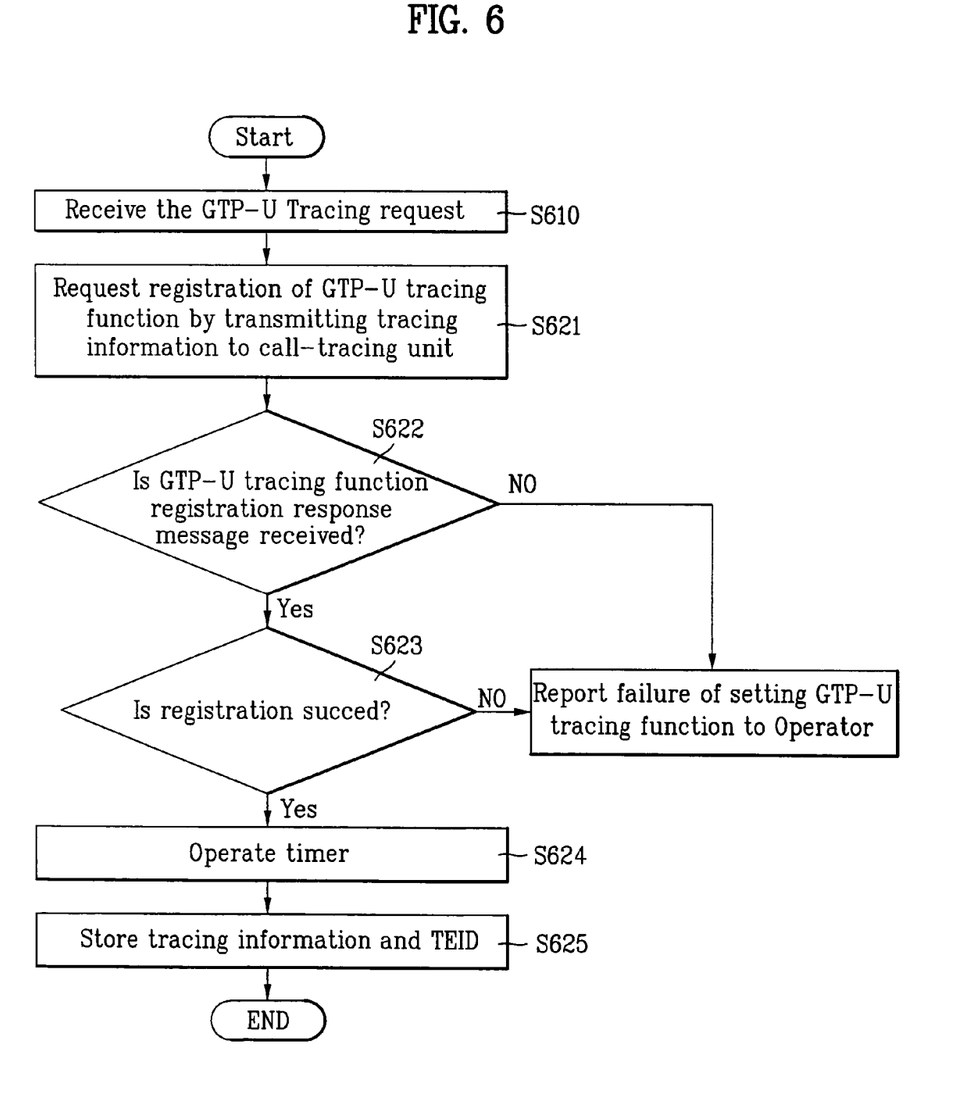
FIG. 6 illustrates a flow chart of a call-tracing unit for setting GTP-U tracing function in FIG. 5.

FIG. 6 is a flow chart showing steps preferred by the call tracing unit 24 for setting GTP-U tracing function in FIG. 5. First, the call-tracing unit 24 receives the GTP-U tracing request message from the operator through the MMI 30 (S610). The GTP-U tracing request message includes the IMSI or IP address, i.e., the tracing information for the subscriber to be traced, the trace critical value, and the trace function duration for limiting the corresponding tracing time.

The call-tracing unit 24 stores the IMSI or IP address in the GTP-U tracing function registration request message (Call- TraceEstReg signal), and transmits the tracing information to the GTP-U tracing unit 22 so as to request the GTP-U tracing function registration (S621). In this case, the call tracing unit 24 sets time-out as long as a time of TMR1 for detecting whether a response message is received from the GTP-U tracing unit 22 within a predetermined time.

Upon receiving the GTP-U tracing function registration response message corresponding to GTP-U tracing function registration request from the GTP-U tracing unit 22 (S622), the call-tracing unit 24 searches the result value stored in the response message, and operates a timer corresponding to the trace function duration contained in the tracing information from the operator (S623, S624) if the registration value is the registration success (the GTP-U tracing flag is activated).

In other words, when the GTP-U tracing function registration is succeeded, a timer termination signal storing the TEID received from the GTP-U tracing unit 22 together with the trace function duration is registered into an OS such that the timer termination signal reporting a termination of the trace function duration can be received.

In this instance, when the registration of the timer termination signal fails, the call-tracing unit 24 reports to the operator that setting the GTP-U tracing function is failed. (S626).

Setting the GTP-U tracing function according to the GTP-U tracing request of the operator is finished (S625) by storing the received tracing information from the operator and the TEID contained in GTP-U tracing registration response message received from the GTP-U tracing unit 22.

Meanwhile, when there is no response message for the GTP-U tracing function registration request from the GTP-U tracing unit 22, or the result value of the response message for the corresponding GTP_U tracing function registration request is a value (FAIL) indicating the failure of the registration (S623), the failure of setting the GTP-U tracing function is reported to the operator (S626).

Figure 7:
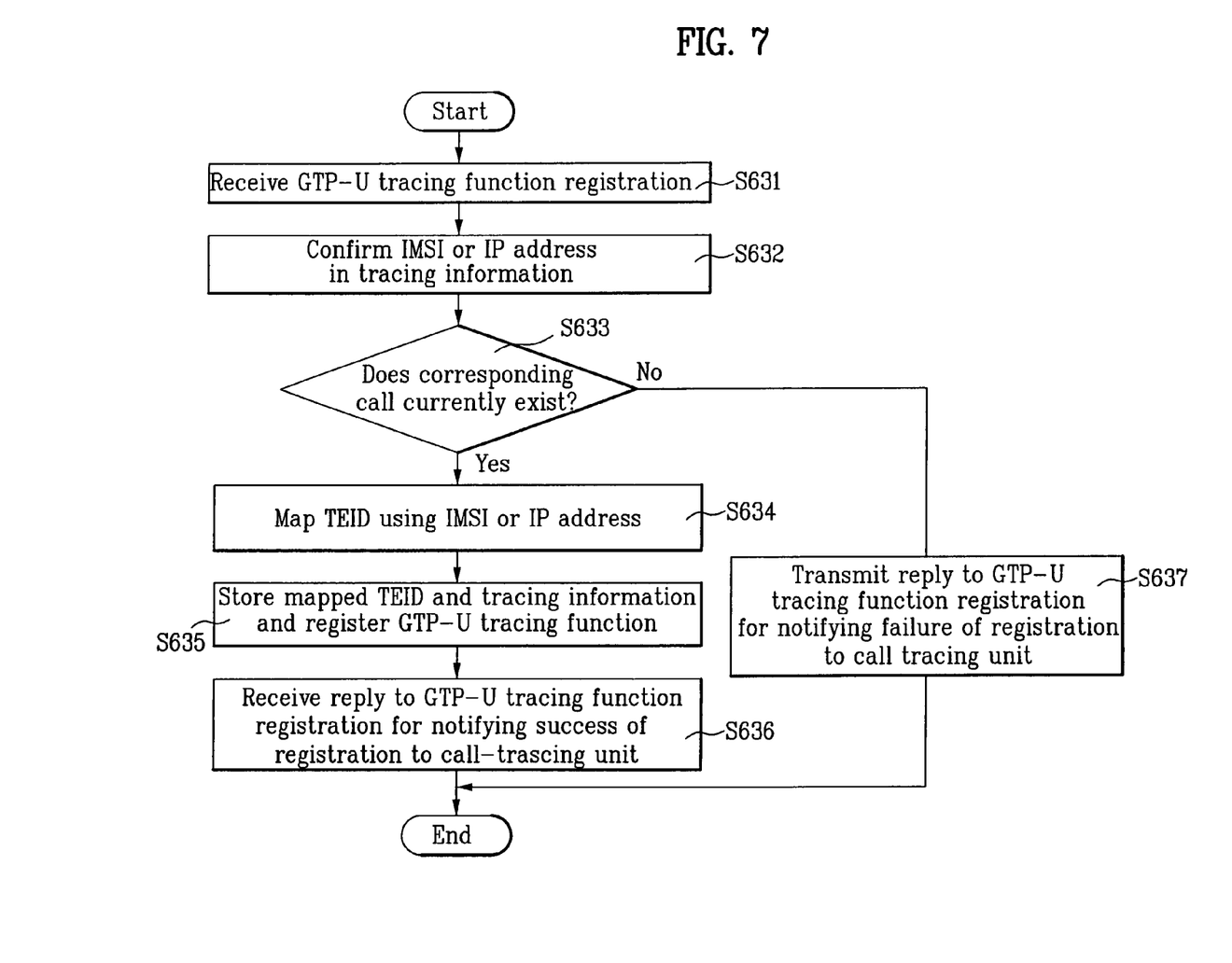
FIG. 7 illustrates a flow chart of a GTP-C tracing unit for setting GTP-C tracing function in FIG. 5.

FIG. 7 is a flow chart of GTP-C tracing unit for setting GTP-C tracing function in FIG. 5. Referring to FIG. 7, the GTP-U tracing unit 22 receives the GTP-U tracing function registration request message from the call-tracing unit 24 through the call tracing interface unit 33 (S631) and then the call tracing interface unit 33 confirms whether the call for the corresponding subscriber exists by decoding the IMSI or IP address from the tracing information contained in the corresponding message (S632, S633).

As a result of the above confirmation, in case there is a corresponding call, the call tracing interface unit 33 requests converting TEID corresponding to the IMSI or IP address to the TEID converter 31, and the TEID converter 31 replies to the call tracing interface unit 33 so as to map the IMSI or IP address (S634).

The call tracing interface unit 33 sets the GTP-U tracing function by providing the TEID and the tracing information with the GTP-U traffic detector 32 and requesting the GTP-U tracing function registration to the GTP-U traffic detector 32, and stores (S635) the GTP-U tracing registration data such as the mapped TEID and the tracing information (trace critical value) to the GTP-tracing DB 35 (S635).

After the GTP-U tracing function registration is set as abovementioned, the call tracing interface unit 33 of the GTP-U tracing unit 22 sets the result value (SUCCESS) indicating a success of the registration to the GTP-U tracing function registration response message and transmits the GTP-U tracing function registration response message together with the TEID to the call-tracing unit 24 (S636).

As a result of the confirmation whether the call for the subscriber at the step exists (S633), when the call does not exist, the call tracing interface unit 33 sets the result value (FAIL) indicating a registration failure to the is set on the GTP-U tracing function registration response message and transmits the GTP-U tracing function registration message to the call tracing unit 24 (S637).

Figure 8:
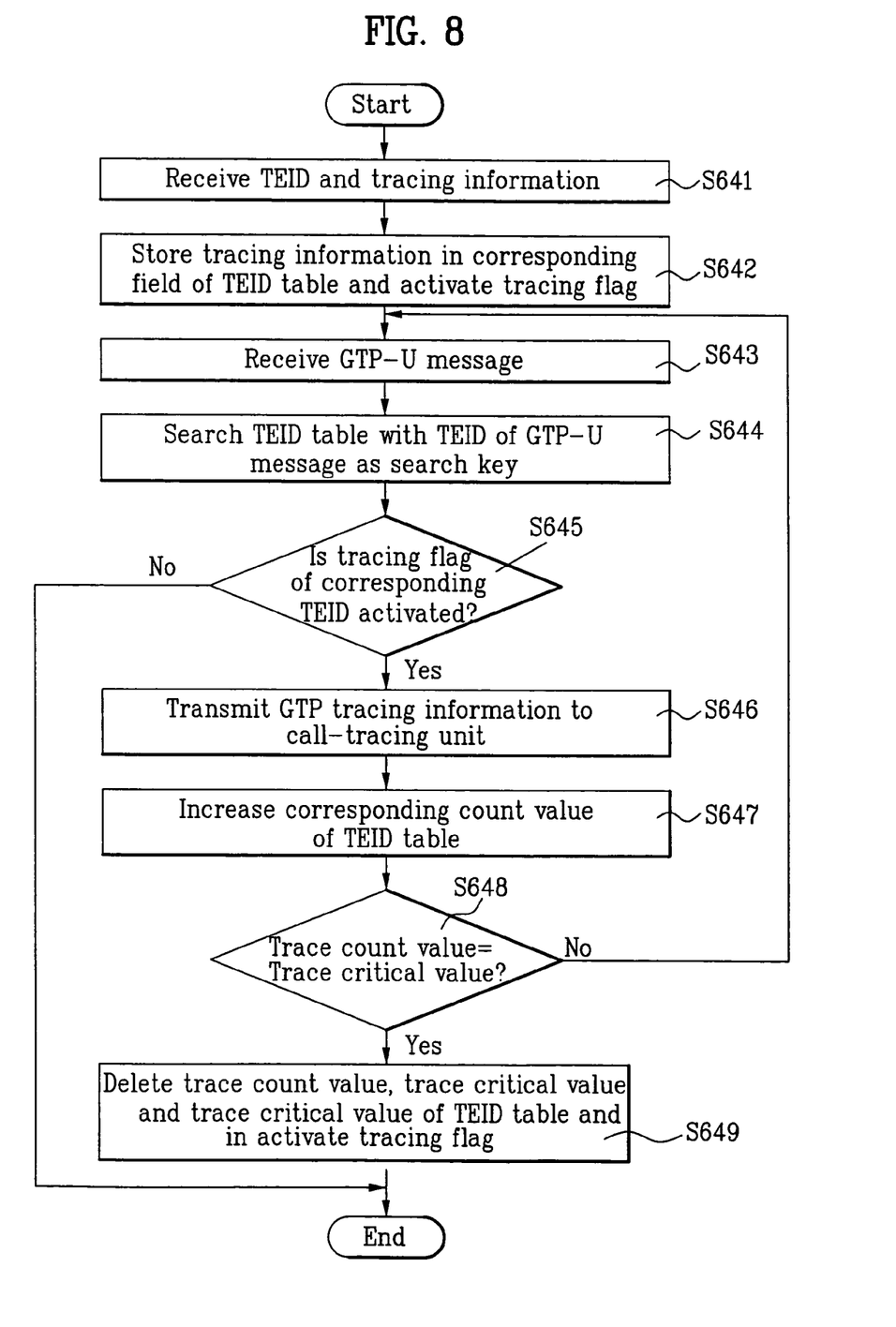
FIG. 8 illustrates a flow chart of GTP-C of the GTP-C tracing unit for tracing the GTP-U in FIG. 5.

FIG. 8 is a flow chart of GTP-C of GTP-C tracing unit 22 for the GTP-U in FIG. 5. Referring to FIG. 8, the GTP-U traffic detector 32 of the GTP-U tracing unit 22 stores the received tracing information in a trace critical value field corresponding to the received TEID in the TEID table as in Table 2 and activates the corresponding tracing flag (S642) when the TEID related to the GTP-U tracing function registration and the tracing information (trace critical value) are received from the call tracing interface unit 33 (S641).

The GTP-U traffic detector 32 of the GTP-U tracing unit 22 receives the GTP-U trafficked through the SGSN interface unit 21 or the internet interface unit 23, and confirms the TEID of the corresponding message (S643) and the GTP-U traffic detector 32 confirms whether the tracing flag for the corresponding TEID is activated by searching the confirmed TEID in the TEID table with a search key (S644).

As a result of aforementioned confirmation, when the tracing flag of the corresponding TEID is activated, the GTP resource information as in FIG. 5 and the TEID are stored on the GTP resource information message. The GTP resource information message is transmitted to the call tracing interface unit 33, and the call tracing interface unit 33 then transmits the GTP resource information to the call-tracing unit 24 together with the corresponding TEID.

In this case, the call tracing interface unit 33 transmits a permission request signal for permitting an output of the tracing message to the trace load controller 24. The trace load controller 34 receives the permission request signal and confirms the tracing permission, writes a number of the traced message to the GTP-U tracing DB 35, and replies to the call tracing interface unit 33 for permitting output of the tracing message.

The call tracing interface unit 33 increases the corresponding trace count value of the TEID Table by 1 (S647), compares the trace count value with the corresponding trace critical value (S648), performs a next GTP-U detection when the trace count value is not the same with the corresponding trace critical value (S644), or deletes the trace count value and the trace critical value and terminates the GTP-U tracing movement by inactivating the tracing flag (S649) when the trace count value is the same as the corresponding trace critical value.

Preferably, comparison of the trace count value and the trace critical value is separately carried out for each of the up stream and down stream. Therefore, the GTP-U tracing movement of the corresponding stream is terminated when the trace count value of one of the up/down streams is the same as the trace critical value.

Figure 9:
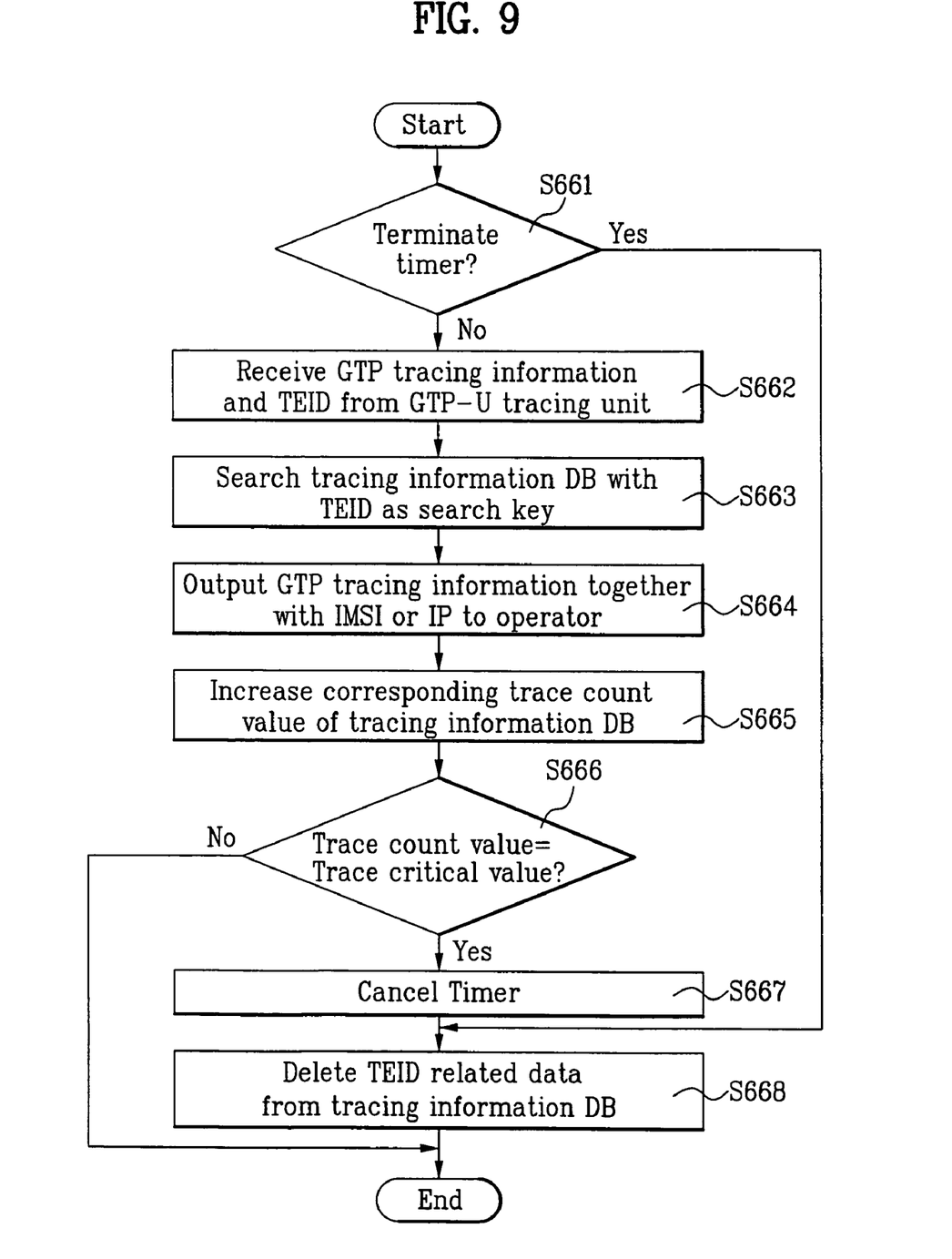
FIG. 9 illustrates a flow chart of the GTP tracing unit for outputting GTP resource information in FIG. 5.

FIG. 9 is a flow chart showing steps preferred by the call tracing unit for outputting GTP resource information in FIG. 5. Referring to FIG. 9, for a period of time when the timer corresponding to the tracing function duration is not terminated (S661), the call-tracing unit 24 searches whether the corresponding TEID included in the GTP resource information message received from the GTP-U tracing unit 22 is stored on the tracing information DB 25 by using the search key (S662, S663).

As a result of the search, the call tracing unit 24 aborts the received GTP resource information message when the TEID is not stored on the tracing information DB 25, and outputs the IMSI or IP address mapped to the TEID together with the GTP resource information contained in the GTP resource information message to the operator through the MMI 30 when the TEID is stored on the tracing information DB 25 (S664).

In this instance, the GTP resource information includes the trace count value stored in the TEID table of the GTP-U tracing unit 22, and the trace count value is the same value as the trace count value stored in the tracing information DB 25. However, when the trace count values are different from each other by the inconsistency of the GTP-U tracing unit 22 and the call-tracing unit 24, the GTP resource information has the trace count value stored on the tracing information DB.

The call-tracing unit 24 which output the GTP resource information increases the corresponding trace count value of the tracing information DB 25 by 1, compares to the next trace critical value (S665, S666), cancels the timer by using the timer ID stored on the tracing information DB 25 when the tracing count vale and the trace critical value are the same (S667), and terminates the corresponding GTP-U tracing by deleting the data related to the corresponding TEID in the tracing information DB 25, i.e., the tracing information and the trace count value (S668).

Preferably, comparison of the trace count value and the trace critical value is separately carried out for each of the up/down streams. Therefore, the GTP-U tracing movement of the corresponding stream is terminated when one of the trace count values of the up stream and down stream is the same as the trace critical value.

Meanwhile, when the timer corresponding to the tracing function duration is terminated, i.e., the timer termination signal registered in OS is received (S661), the call-tracing unit 24 searches the tracing information DB 25 by using the TEID contained in the timer termination signal as the search key, and detects all the corresponding data related to TEID so as to terminate the corresponding GTP-U tracing movement (S668). In this case, the timer termination signal is aborted when the TEID does not exist in the tracing information DB 25.

In the meantime, when the call of the subscriber to be traced is canceled, the call-tracing unit 24 receives a session termination notifying message from the call manager 26, searches the tracing information DB 25 by using the IMSI or IP address contained in the session termination notifying message and the TEID as the search key, deletes all the related data such as the tracing information and the trace count value corresponding to the corresponding TEID, and terminates the corresponding GTP-U tracing movement.

When the operator requests to cancel the GTP-U tracing function for a particular subscriber whose GTP-U tracing function was set already, where the request is set in the GTP-U tracing function from the operator, the GTP-U tracing function is canceled through the same abovementioned GTP-U tracing function setting.

Figure 10:
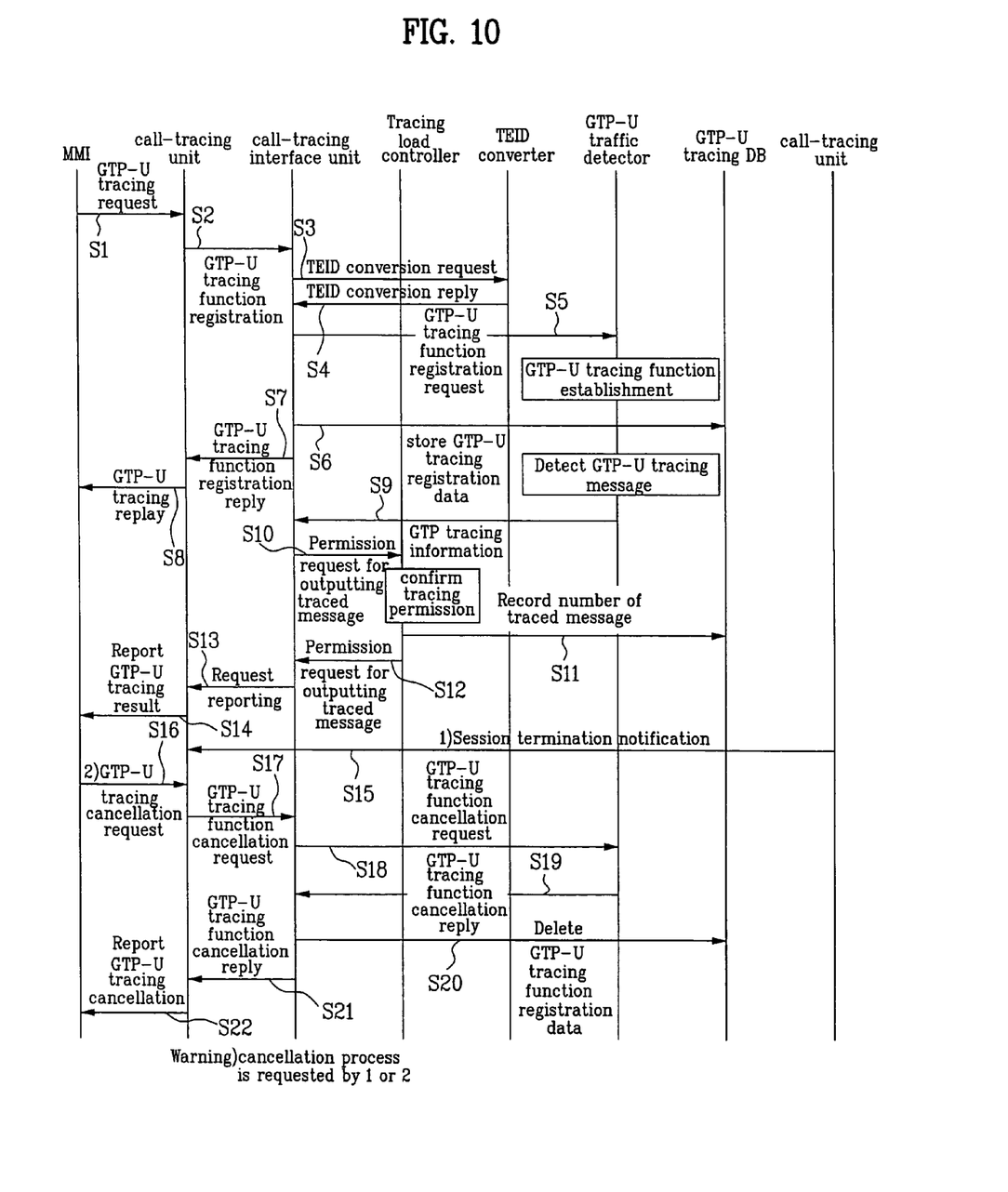
FIG. 10 illustrates a flow diagram of controlling for tracing GTP-U in accordance with one embodiment of the present invention.

FIG. 10 is a flow diagram of how tracing of GTP-U may be controlled in accordance with one embodiment of the present invention. Referring to FIG. 10, the call-tracing unit 24 receives the GTP-U tracing request message including the tracing information for the subscriber to be traced from the operator through the MMI 30 (S1) and transmits the GTP-U tracing function registration request message containing the tracing information (IMSI or IP address and the trace critical value) to the call tracing interface unit 33 of the GTP-U tracing unit 22 (S2).

The call interface unit 33 confirms whether the call for the subscriber to be traced exists by detecting the IMSI or IP address from the tracing information contained in a message for requesting the GTP-U tracing function registration request message. As a result of the confirmation, when the call for the subscriber to be traced exits, the call interface unit 33 requests that the TEID converter 31 converts the IMSI or IP address to the TEID (S3), and the TEID converter 31 replies to the request of the call interface unit 33 by mapping the IMSI or IP address (S4).

The call interface unit 33 requests the GTP-U tracing function registration together with the TEID and the tracing information to the GTP-U traffic detector 32 such that the GTP-U traffic detector 32 sets the GTP-U tracing function (S5), and stores the GTP-U tracing function registration data such as the mapped TEID and the tracing information (trace critical value) on the GTP-U tracing DB 35 (S6).

Upon setting the GTP-U tracing function registration as aforementioned, the call tracing interface unit 33 of the GTP-U tracing unit 22 sets the result value (SUCCESS) reporting the success of registration onto the GTP-U tracing function registration response message and transmits the GTP-U tracing function registration response message together with the TEID to the call tracing unit 24 (S7). Then, the call-tracing unit 24 stores the TEID contained in the GTP-U tracing function registration response message and the tracing information inputted by the operator on the tracing information DB 25 and transmits the GTP-U tracing function registration response message to the operator through the MMI 30 (S8).

In this case, the GTP-U traffic detector 32 of the GTP-U tracing unit 22, receives the GTP-U trafficked through the SGSN 10 interface unit 21 or the internet interface unit, stores the GTP-U resource information together with the corresponding TEID in the GTP-resource information message and transmits the GTP resource information message to the call tracing interface unit 33 (S9).

The call tracing interface unit 33 receiving the GTP resource information message as abovementioned transmits the permission request signal for outputting the tracing message to the trace load controller 34 (S10). And, the trace load controller 34 receiving the permission request signal confirms the tracing permission, writes the number of traced messages onto the GTP-U tracing DB 35 (S11), and replies to the call interface unit 33 for permitting the output of the tracing message (S12).

Then, the call tracing interface unit 33 transmits the received GTP resource information together with the corresponding TEID to the call tracing unit 24 (S13). The call-tracing unit 24 then searches the IMSI or IP address mapped in the TEID received from the tracing information DB 25, stores the searched IMSI or IP address and the GTP resource information onto the GTP-U tracing result message, and reports to the operator through the MMI 30 (S14).

Meanwhile, the call tracing unit 26 transmits the session termination message to the call-tracing unit 24 when the call of the subscriber to be traced is canceled (S15). When the GTP-U tracing function cancel request message including information for the subscriber to be traced is received from the operator through the MMI 30 (S16), the call tracing unit 24 transmits the GTP-U tracing function cancel request message to the call tracing interface unit 33 of the GTP-U tracing unit 22 (S17).

The call interface unit 33 transmits the GTP-U tracing function cancel request signal to the GTP-U traffic detector 32 such that the GTP-U traffic detector 32 inactivates the tracing flag of the corresponding TEID and cancels the GTP-U tracing function (S18, S19), and deletes all the related data in the GTP-U tracing DB 35 by using the IMSI, IP address or TEID contained in the GTP-U tracing function cancel request message (S20).

The call interface unit 33 transmits the GTP-U tracing cancel response message containing the TEID to the call tracing unit 24 (S21). The call interface unit 24 deletes all the related data in the tracing information DB 25 by using the TEID contained in the GTP-U tracing cancel response message so as to terminate the GTP-U tracing function for the corresponding subscriber and reports to the operator that the GTP-U tracing function is canceled through the MMI 30 (S21).

The present invention thus traces the GTP-U of a subscriber using the TEID of the subscriber to be traced, to provide an improved understanding of the GTP resource allotted to a corresponding GTP-U message that is the data of the subscriber. Furthermore, the present invention effectively manages packet troubles generated from the SGSN and the attack of such DDOS through the GTP-U on Internet by isolating only the interface generating the corresponding attack.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for tracing GTP resource, comprising:
   a call tracing unit for receiving a command of a call tracing from an operator through MMI and performing the call tracing;
   a call tracing DB for storing call-tracing data currently processed;
   a GTP-U tracing unit for tracing a GTP-U message and reporting the GTP-U message to the call tracing unit;
   a SGSN interface unit for receiving the GTP-U message outputted from the SGSN; and
   an internet interface unit for transmitting the GTP-U message routed at the GTP-U tracing unit to an internet network, wherein the GTP-U tracing unit comprises:
      a call tracing interface unit for processing a GTP-U tracing function message requested from the call tracing unit and transmitting a result of the GTP-U data tracing;
      a TEID converter for converting the IMSI or IP received from the call tracing interface unit to a TEID;
      a trace load controller for minimizing a load of an exchanger, the load generated from the GTP-U data tracing function;
      a GTP-U traffic detector for detecting a traffic for tracing the GTP-U between the SGSN interface unit and the internet interface unit; and
      a GTP-U tracing DB for storing the IMSI information for mapping the TEID and information for the GTP-U tracing.

2. A method for tracing GTP resource, comprising:
   setting a tracing function for reserved resources of a GTP-U by using a TEID for a subscriber to be traced; and
   outputting information for the reserved resource by detecting the GTP-U having the tracing function set therein, wherein outputting said information for the reserved resource information comprises:
      receiving and storing the TEID related to the registration of the GTP-U tracing function and the tracing information in a tracing information DB, and activating a tracing flag corresponding to the TEID;
      confirming a TEID of the GTP-U trafficked between the SGSN and the GGSN;
      confirming whether the tracing flag corresponding to the confirmed TEID is activated by searching the TEID table; and
      outputting the reserved resource information of the GTP-U to the operator by using the TEID.

3. The method for tracing GTP resource of claim 2, wherein the reserved resource information comprises an AMA number of trafficked subscriber message, an interface number, a VPI/VCI, a link band, a value directing a stream direction of the data, and the trace count value.

4. The method for tracing GTP resource of claim 2, wherein outputting the reserved resource information comprises:
   confirming whether the TEID is stored by searching the tracing information DB;
   mapping the reserved resource information to a subscriber tracing information corresponding to the TEID and outputting the mapped subscriber tracing information to the operator when the TEID is stored;
   increasing a trace count value in the tracing information and comparing the trace count value with a trace critical value; and
   deleting the TEID and the tracing information in the tracing information DB when the trace count value is the same as the trace critical value.

5. A method for tracing GTP resource, the GTP trafficked between a SGSN and a GGSN at an exchanger including the SGSN and the GGSN having a call tracing unit, a call manager, a tracing information DB, and GTP-U tracing unit, comprising:
   setting a tracing function for reserved resource of a GTP-U using TEID of a subscriber to be traced; and
   detecting the GTP-U having the tracing function set therein and outputting information for the reserved resource of the GTP-U message, wherein setting the tracing function comprises:
      requesting, by the call tracing unit, a GTP-U tracing function registration to the GTP-U tracing unit by transmitting a tracing information for a subscriber received from an operator to the GTP-U tracing unit;
      mapping, by the GTP-U tracing unit, the TEID allotted to the subscriber using the tracing information;
      registering, by the GTP-U tracing unit, the GTP-U tracing function using the TEID and transmitting the TEID to the call tracing unit; and
      storing, by the call tracing unit, the TEID together with the tracing information in the tracing information DB.

6. The method for tracing GTP resource of claim 5, further comprising transmitting, by the GTP-U tracing unit, a response message to the request of the GTP-U tracing function registration to the call tracing unit after said requesting.

7. The method for tracing GTP resource of claim 6, further comprising reporting, by the call tracing unit, a failure of the GTP-U tracing function registration to the operator when there is no response message to the request of the GTP-U tracing function registration from the GTP-U tracing unit within a predetermined time.

8. The method for tracing GTP resource of claim 5, wherein said mapping further comprises transmitting a response message for notifying a failure of the GTP-U tracing function registration from the GTP-U tracing unit to the call tracing unit and reporting the failure of the GTP-U tracing function registration from the call tracing unit to the operator when the GTP-U tracing unit confirms that the call for the subscriber does not exist by mapping the TEID allotted to the subscriber.

9. The method for tracing GTP resource of claim 5, wherein the tracing information comprises the IMSI and IP address of the subscriber.

10. The method for tracing GTP resource of 9, wherein the tracing information comprises 2bits indicating SGSN record type and a tracing type for classifying call watching, call tracing, and GTP-U tracing according to the SGSN record type of the 2bits.

11. The method for tracing GTP resource of claim 5, wherein the tracing information DB stores the tracing information, the TEID, and a trace count value notifying the number of the traced message.

12. The method for tracing GTP resource of claim 5, wherein said mapping comprises:
   converting the tracing information (INSI or IP) received from the call tracing unit to the TEID and storing the converted TEID and the tracing information at the GTP-U tracing unit; and
   activating a tracing flag corresponding to the TEID.

13. A method for tracing GTP resource, the GTP trafficked between a SGSN and a GGSN at an exchanger including the SGSN and the GGSN having a call tracing unit, a call manager, a tracing information DB, and GTP-U tracing unit, comprising:
   setting a tracing function for reserved resource of a GTP-U using a TEID of a subscriber to be traced; and
   detecting the GTP-U having the tracing function set therein and outputting information for the reserved resource of the GTP-U message, wherein outputting the reserved resource information comprises:
      confirming the TEID of a trafficked GTP-U at the GTP-U tracing unit;
      confirming whether a tracing flag of the TEID is activated by searching the table with the confirmed TEID at the GTP-U tracing unit;
      transmitting information for the reserved resource of the GTP-U together with the TEID from the GTP-U tracing unit to the call tracing unit when the tracing flag is activated; and
      outputting the reserved resource information from the call tracing unit to the operator using the TEID.

14. The method for tracing GTP resource of claim 13, wherein the reserved resource information comprises an AMA number of the trafficked GTP-U, an interface number, VPI/VCI, a link band, a value directing a stream direction of the data, and a trace count value.

15. The method for tracing GTP resource of claim 13, wherein outputting the reserved resource information to the operator comprises:
   confirming whether the TEID received from the GTP-U tracing unit is stored by searching the tracing information DB;
   mapping a subscriber tracing information corresponding to the TEID with the reserved resource information and outputting the mapped resource information to the operator when the TEID is stored;
   increasing a trace count value in the call tracing information and comparing the trace count value with a trace critical value; and
   deleting the TEID and the tracing information from the tracing information DB when the trace count value is the same as the trace critical value.

16. The method for tracing GTP resource of claim 15, wherein the comparison of trace count value and trace critical value is separately carried out for each of up stream and down stream, and the TEID and the tracing information are deleted from the tracing information DB when the trace count value of one of the up/down stream is the same as the trace critical value.

17. The method for tracing GTP resource of claim 5, further comprising operating a timer corresponding to a tracing function duration at the call tracing unit when the TEID is received if the tracing information has information of the tracing function duration.

18. The method for tracing GTP resource of claim 17, further comprising canceling the GTP-U tracing function by deleting the TEID and the tracing information from the tracing information DB when the timer is terminated.

* * * * *

UNITED STATES PATENT AND TRADEMARK OFFICE
CERTIFICATE OF CORRECTION

PATENT NO. : 7,602,753 B2 Page 1 of 1
APPLICATION NO. : 10/796159
DATED : October 13, 2009
INVENTOR(S) : Tae Yong Kim It is certified that error appears in the above-identified patent and that said Letters Patent is hereby corrected as shown below:

Item (73) on the title page of this patent, change "Assignee: LG Electronics Inc." to
-- Assignee: LG-NORTEL CO., LTD. --

Signed and Sealed this

Twenty-seventh Day of July, 2010

David J. Kappos
*Director of the United States Patent and Trademark Office*